United States Patent
Duggal et al.

(10) Patent No.: US 11,573,892 B2
(45) Date of Patent: Feb. 7, 2023

(54) GARBAGE COLLECTION FOR A DEDUPLICATED CLOUD TIER USING MICROSERVICES

(71) Applicant: EMC IP Holding Company LLC, Hopkinton, MA (US)

(72) Inventors: Abhinav Duggal, Colma, CA (US); Ramprasad Chinthekindi, San Jose, CA (US); Philip Shilane, Newtown, PA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 137 days.

(21) Appl. No.: 16/395,984

(22) Filed: Apr. 26, 2019

(65) Prior Publication Data
US 2020/0341892 A1  Oct. 29, 2020

(51) Int. Cl.
*G06F 12/02* (2006.01)
*G06F 3/06* (2006.01)

(52) U.S. Cl.
CPC .......... *G06F 12/0253* (2013.01); *G06F 3/067* (2013.01); *G06F 3/0608* (2013.01); *G06F 3/0641* (2013.01); *G06F 3/0647* (2013.01); *G06F 3/0652* (2013.01)

(58) Field of Classification Search
CPC .. G06F 12/0253; G06F 3/0608; G06F 3/0652; G06F 3/067; G06F 9/45558; G06F 2009/45562; G06F 2009/45595
See application file for complete search history.

(56) References Cited

U.S. PATENT DOCUMENTS

| | | | |
|---|---|---|---|
| 9,411,815 B1* | 8/2016 | Lu | G06F 11/1453 |
| 9,794,061 B1* | 10/2017 | Bushman | G06F 21/602 |
| 9,959,280 B1 | 5/2018 | Whitehead et al. | |
| 10,078,583 B1* | 9/2018 | Wallace | G06F 11/1453 |
| 10,235,285 B1 | 3/2019 | Wallace | |
| 2005/0256864 A1 | 11/2005 | Semerdzhiev | |
| 2013/0191626 A1 | 7/2013 | Kuno et al. | |
| 2015/0356110 A1 | 12/2015 | Lin et al. | |
| 2017/0169233 A1* | 6/2017 | Hsu | G06F 21/602 |
| 2018/0196743 A1 | 7/2018 | McVay et al. | |
| 2019/0362081 A1* | 11/2019 | Kanno | G06F 3/0688 |

(Continued)

FOREIGN PATENT DOCUMENTS

EP  3367292  8/2018

OTHER PUBLICATIONS

International Search Report and Written Opinion received for PCT Patent Application No. PCT/US2019/068028, dated Apr. 20, 2020.

(Continued)

*Primary Examiner* — Andrew J Cheong
(74) *Attorney, Agent, or Firm* — Workman Nydegger

(57) ABSTRACT

Systems and methods for performing data protection operations including garbage collection operations and copy forward operations. For deduplicated data stored in a cloud-based storage or in a cloud tier that stores containers containing dead and live regions such as compression regions, the dead segments in the dead compression regions are deleted by copying the live compression regions into new containers and then deleting the old containers. The copy forward is based on a recipe from a data protection system and is performed using a microservices based approach.

20 Claims, 9 Drawing Sheets

(56) References Cited

U.S. PATENT DOCUMENTS

2021/0096898 A1* 4/2021 Tsirkin .................... G06F 12/10
2021/0294502 A1* 9/2021 Wang .................... G06F 3/0641

OTHER PUBLICATIONS

International Search Report and Written Opinion received for PCT Patent Application No. PCT/US2020/023578, dated Jul. 6, 2020, 15 pages.
U.S. Patent Application filed Apr. 26, 2019, by Shilane et al., Entitled "Garbage Collection for a Deduplicated Cloud Tier,", U.S. Appl. No. 16/395,966.
U.S. Patent Application filed Apr. 26, 2019, by Duggal et al., U.S. Appl. No. 16/395,984.
PCT/US2019/068013, Apr. 24, 2020, International Search Report and Written Opinion.
U.S. Appl. No. 16/395,966, filed Apr. 26, 2019, Shilane et al.
U.S. Appl. No. 16/402,288, filed May 3, 2019, Chinthekindi et al.

* cited by examiner

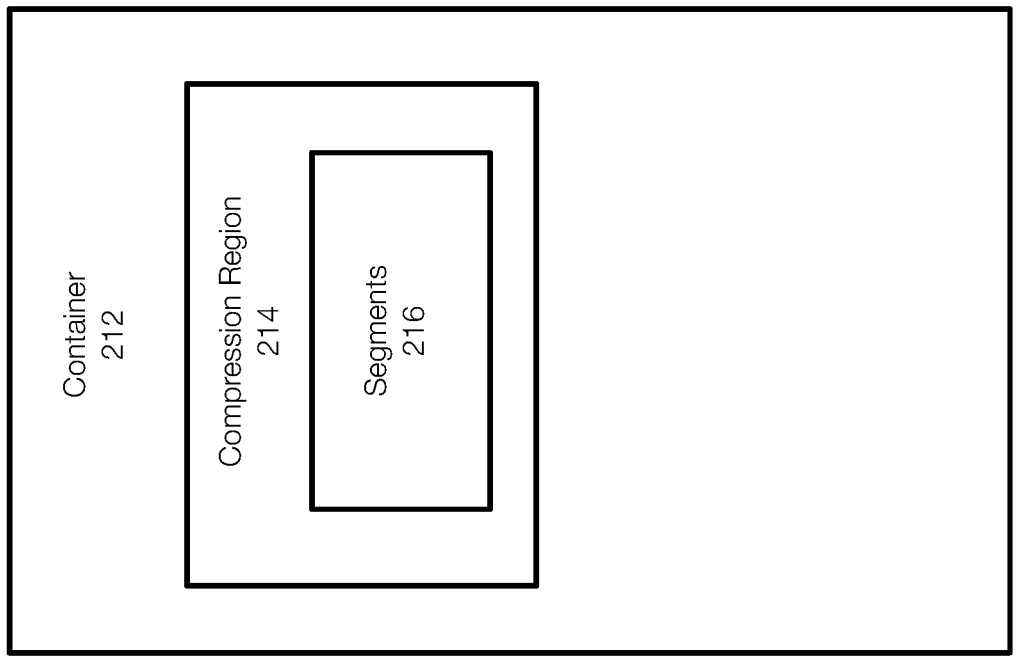
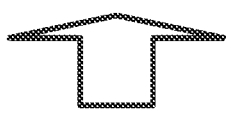
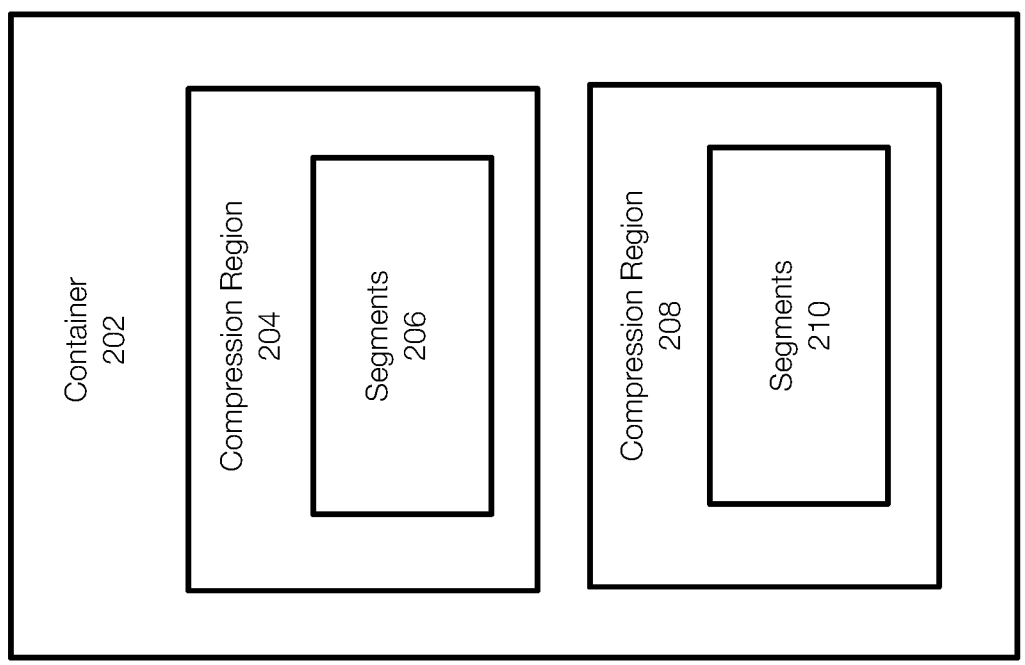
Figure 2

GC Cost metrics using copy forward GC

| | MONTHLY GC COST | |
|---|---|---|
| | STANDARD | STANDARD IA |
| Storage Cost | -$2,126.25 | -$1,265.63 |
| TRANSACTION COST | | |
| Number of object read | 3317760000 | |
| Cost of GETs from CT | $ 1,327.10 | $ 3,314.76 |
| Data Retrival Cost | $ - | $ 2,025.00 |
| Data transfer cost (up to 10TB)/month | $ 921.60 | $ 921.60 |
| Data transfer cost (next 40TB)/month | $ 3,481.60 | $ 3,481.60 |
| Data transfer cost (next 150TB)/month | $ 10,591.00 | $ 3,423.00 |
| Total Data Tranfer Cost | $ 14,994.20 | $ 7,826.20 |
| Number of objects written | 26542080 | |
| Cost of PUTS to CT | $ 132.71 | $ 265.42 |
| Data Write Cost | $ - | $ - |
| Total Transaction Cost | $ 16,454.01 | $ 13,434.38 |
| TOTAL GC COST | $14,327.76 | $12,168.76 |

*FIG. 7*

GARBAGE COLLECTION FOR A DEDUPLICATED CLOUD TIER USING MICROSERVICES

FIELD OF THE INVENTION

Embodiments of the invention relate to systems, methods, and apparatus for protecting data. More particularly, embodiments of the invention relate to data protection operations including backup operations, restore operations, deduplication operations, and garbage collection operations. More specifically, embodiments relate to systems and methods for collecting garbage in a deduplicated cloud tier.

BACKGROUND

In many computing systems, data is often stored locally or on-site in an on-premise network. For many reasons, some entities desire to move at least some of their data to a target site such as a cloud-based storage system (the cloud). To reduce the storage costs associated with the cloud, it is useful to deduplicate the data before the data is written to the cloud. Entities that store their data in a deduplicated manner in the cloud may have the expectation that their cloud storage costs will decrease as data is deleted. This is not always true.

It turns out that deleting the objects can incur cost. This is due to deduplication. As new objects are written to the cloud, parts of data in previous object may be referenced by new files. When old objects are deleted, not everything in the objects becomes unreferenced. To delete the unreferenced portions, the objects need to be defragmented by reading the referenced parts of these objects and writing them into new objects. While writing to the cloud is inexpensive and often free, reading data from the cloud can be expensive. More specifically, in the context of conventional garbage collection operations, there is a need to transfer large amounts of data. Reading and transferring the data is expensive.

For example, transferring data from a cloud provider may cost $0.0.09 per GB for the first 10 TB transferred. The cost of reading 1 TB per week is about $4,800 per year. Entities that are deleting many TBs of data may incur high network costs during garbage collection operations at least because of the need to transfer the data back to the local system in order to properly delete data that is stored in a deduplicated form.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 2 illustrates an example of copying forward a container in the cloud tier;

FIG. 7 illustrates a cost analysis showing the benefit of a microservice based garbage collection operation and FIG. 8 illustrates a graph illustrating a performance of a microservice based garbage collection operation.

DETAILED DESCRIPTION OF SOME EXAMPLE EMBODIMENTS

Embodiments of the present invention generally relate to data protection and to systems, methods, and apparatus for performing data protection operations. Examples of data protection operations include, but are not limited to, backup operations, restore operations, replication operations, disaster recovery operations, disaster recovery testing operations, failover or partial failover operations, data synchronization operations, replication operations, garbage collection operations, or the like or combination thereof. More particularly, embodiments of the invention relate to systems, hardware, software, computer-readable media, and methods for performing data protection operations including garbage collection operations in the cloud.

Embodiments of the invention relate to a data protection system (e.g., DELL EMC DATA DOMAIN) that includes or provides, by way of example, a local or active tier for data storage and a cloud tier for data storage. More particularly, embodiments of the invention relate to garbage collection operations that are performed on the active tier and/or the cloud tier. In deduplicated storage systems, the data (objects, files, etc.) are often chunked into chunks or segments. A garbage collection operation is performed to remove the segments that no longer correspond to data that should still be stored in the storage system. Unreferenced segments are dead segments and can be removed by the garbage collection operation while live segments should not be removed by the garbage collection operation. Removing dead segments can reduce storage requirements.

The data protection system may be an on-site installation that provides an active tier of storage and a customer may use the cloud tier for certain data. Like the on-premise data, data in the cloud is deduplicated and may be stored in containers that include compression regions of segments.

Figure 1A:
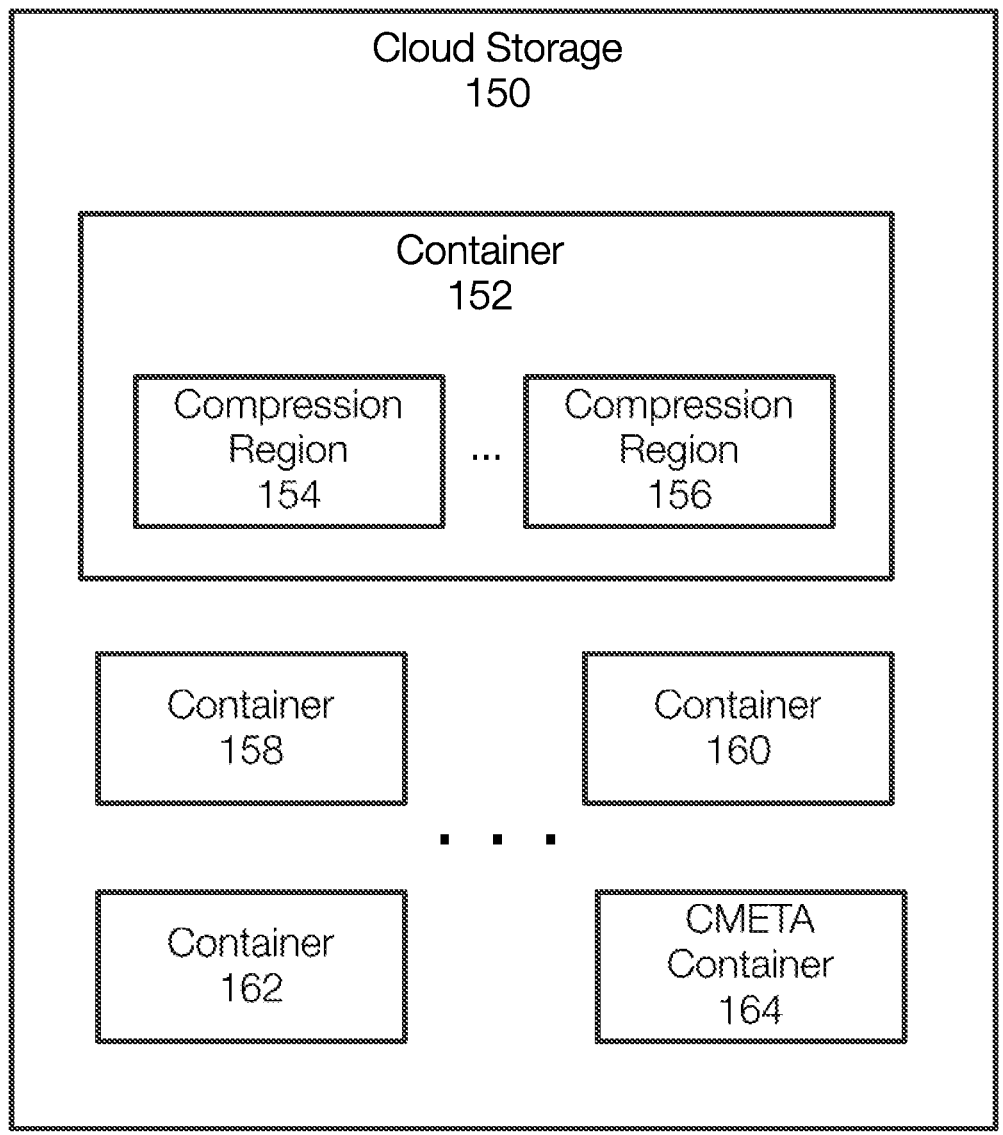
FIG. 1A illustrates an example of data stored in containers in a cloud storage system.

FIG. 1A illustrates an example of data stored in cloud storage. FIG. 1A illustrates a cloud storage 150. The data of a user may be stored in containers. In this example, the cloud storage 150 includes containers, which are represented at containers 152, 158, 160, 162 and 164. The number of containers is not limited and the containers may be of different types. Some containers, such as the containers 152, 158, 160 and 162 may store segments in compression regions. Containers such as the container 164 (CMETA containers) may be metadata containers and may be configured to store metadata.

The container 152, for example, stores segments in compression regions. The compression regions of the container 152 are represented as compression regions 154. Each compression region stores segments of data. Thus, the compression regions 154 and 156 may each store some number of segments.

As described in more detail below, the compression region 154 (like other compression regions) may contain both live segments and dead segments. To clean the container 152, for example, compression regions that are at least partially live (or that include any live segments) can be copied forward into a new container. Compression regions that are dead or that do not contain any live segments are not copied forward. Once the live compression regions are copied forward, the source or old container can be deleted. This reclaims storage space by removing the dead compression regions from the containers. For example, if the compression region 154 is considered live and the compression region 156 is considered dead, the garbage collection operation may copy the compression region 154 into a new container and then delete the container 152 to remove the compression region 156. These changes are reflected in the CMETA container 164 (which may be cleaned in a similar manner). This ensures that the data protection system is aware of the locations of the segments and is able to perform deduplication.

Thus, to free up storage space after data deletions, live compression regions (including partially live compression regions) are copied from an old container to a new container, and the old container is then deleted. More specifically, live compression regions are copied to the new container (an example of copy forward) and, by deleting the old container, the dead compression regions are deleted. In this manner, storage requirements can be reduced because the dead segments are effectively removed.

In addition, the copy forward operation can be performed without having to compress and/or decrypt the compression regions. Rather, the starting addresses or offsets of the compression regions are known to the data protection system. As a result, live compression regions can be copied forward by identifying the container, the starting address, the size of the compression region, and a destination container.

As previously stated, running garbage collection (GC) on data stored in the cloud is conventionally expensive because of the network transfer costs back to the on-premises data protection system during copy-forward or during garbage collection. Because the deduplication is managed by the on-premise appliance, embodiments of the invention reduce costs by reducing the reads and data transfer using instructions or recipes such that any necessary data transfer can occur within the cloud itself. This substantially reduces the amount of data that would otherwise be transferred across the network to the on-premise system.

Embodiments of the invention advance the functioning of the system and relate to a cloud based microservice that can receive instructions from the on-site or on-premise data protection system. The data protection system maintains metadata that allows the data to be deduplicated and that allows the live compression regions and/or the dead compression regions in the cloud tier (and the active tier) to be identified. This information allows instructions to be generated and sent to the cloud based microservice for execution. The instructions from the data protection system may include a recipe that describes which data or which compression regions to copy forward. These recipes can be applied to copy forward the live compression regions from the existing containers to new containers. This eliminates network transfer significantly and dramatically lowers customer costs while supporting fine-grained cleaning of the data stored in the cloud tier. More generally, embodiments of the invention allow the on-premise data protection system to identify ranges of data that are considered live or partially live that can be copied forward. In one example, this allows storage space to be reclaimed without having the decompress/decrypt the cloud objects. In one example, the ranges may or may not coincide with boundaries of the compression regions.

An architecture for performing a garbage collection operation includes a garbage collection (GC) microservice or microservice that pairs with a garbage collection engine of the data protection system (e.g., DATA DOMAIN). In one example, the GC engine running locally pairs with one or more instances of a GC microservice running in the cloud that can interact with the data stored in the cloud. The GC engine coordinates with the GC microservice to perform garbage collection operations in the cloud tier or, more specifically, in the cloud tier object storage.

Figure 1B:
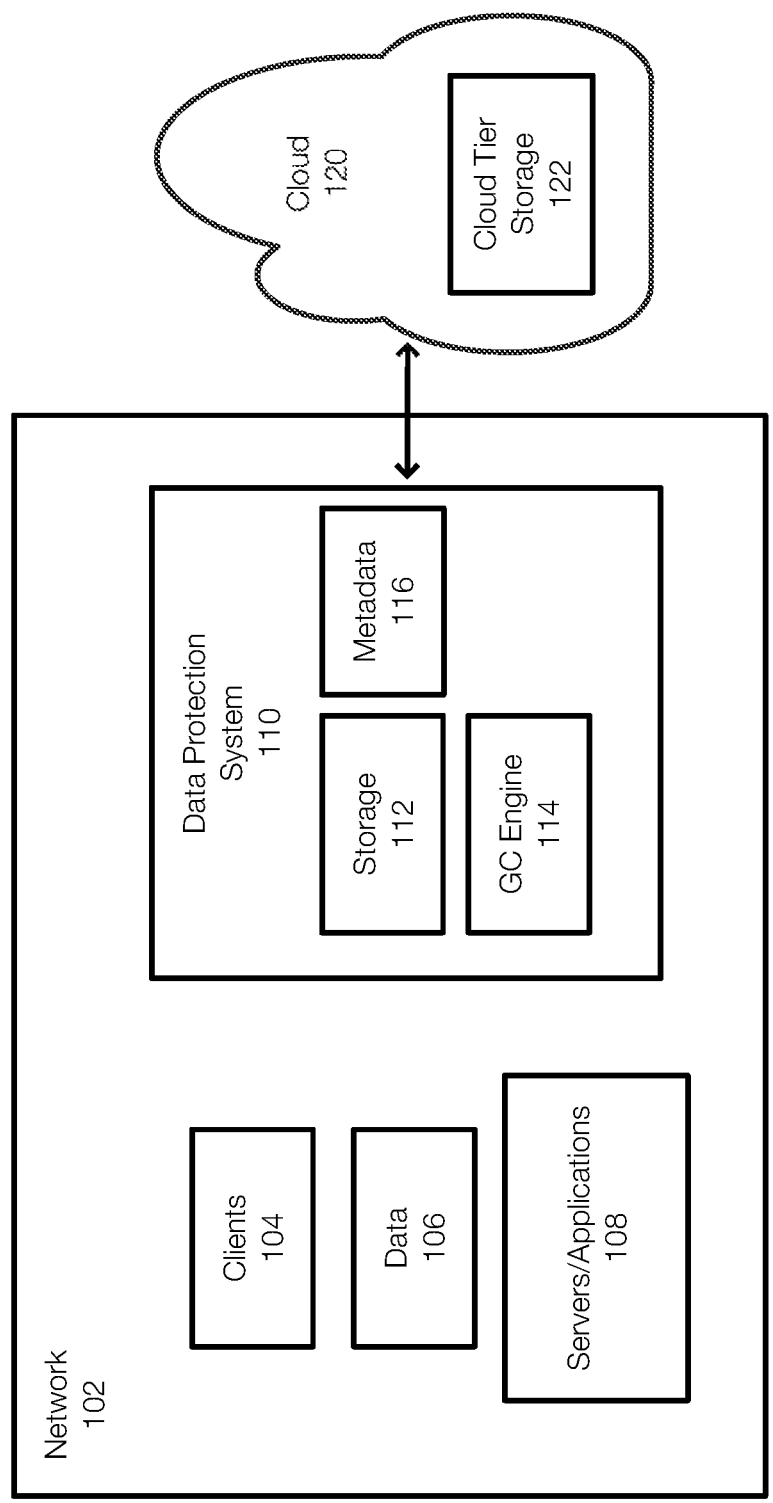
FIG. 1B illustrates an example of a data protection system that provides data protection operations including deduplication and garbage collection in an on-premise active tier and a cloud tier.

FIG. 1B illustrates an example of a system that includes or is associated with a data protection system 110 (e.g., DELL/EMC Data Domain). The data protection system 110 may be implemented, for example, as an appliance (physical or virtual) or using a server/agent configuration.

FIG. 1 illustrates a network 102. The network 102 may be associated with servers/applications 108 (e.g., database, email, file servers, virtualization). The clients 104 are able to use and access the servers and applications 108 over the infrastructure of the network 102. The network 102 is also associated with data 106 that may be stored on storage devices. The data 106 may be stored on storage devices and backed up by the data protection system 110 using storage 112.

The data protection system 110 provides data protection services that may include, but are not limited to, backup operations, restore operations, deduplication operations, garbage collection operations, or the like. The data protection system may provide storage 112 (also referred to as active or local tier). Backups of the data 106 (and/or virtual machines, applications, objects (e.g., files) may be stored in the storage 112. Further, the storage 112 may be deduplicated by the data protection system. The data protection system 110 may also include a garbage collection (GC) engine 114 that is configured to remove unreferenced objects or segments from the storage 112. This is achieved using a GC microservice that does not need to understand the manner in which data or objects are formatted, compressed, and/or encrypted.

The data protection system 110 may also provide or be associated with cloud storage (cloud 120). In one example, the cloud 120 may be used to provide tier storage 122 (also referred to as a cloud tier). The data protection system 110 can use the tier storage 122 to store some of the data that is stored on the storage 112. For example, a customer may select certain files or data from the storage 112 that should be migrated to and stored in the cloud tier storage 122.

At the same time, the data protection system 110 may be responsible for deduplicating the data at both the storage 112 and the cloud tier storage 122. The data protection system 110 may also maintain metadata 116 that identifies live and/or dead segments in the storage 112 and/or the storage 122 or that allows the live and/or dead segments to be identified. The data protection system 110 may also be able to identify live or partially live ranges and/or dead ranges of data.

The data protection system 110 is configured to minimize or reduce data transfer requirements, at least in the context of garbage collection, to/from the cloud while making decisions about the liveness compression regions and while deleting data from the cloud tier storage 122. Metadata 116 stored locally at the data protection system 110 allows the GC engine 114 to determine the liveness of segments and make decisions about which data (e.g., ranges, compression regions) to copy forward from an existing cloud container to new cloud containers in the cloud tier storage 122.

FIG. 2 illustrates an example of containers stored in the cloud tier and illustrates the copy forward process. FIG. 2 illustrates a container 202. In this example, the container 202 is an existing container that is present in the cloud before the garbage collection operation begins. The container 202 includes compression regions (represented by compression regions 204 and 208). The compression region 204 includes segments 206 and the compression region 208 includes segments 210.

At the beginning of a garbage collection operation, the GC engine 114 may determine that at least some of the segments 206 are live segments. The GC engine 114 may also determine that none of the segments 210 are live segments. In other words, the GC engine 114 can determine that the compression region 208 is a dead compression region and that the compression region 204 is a live compression region.

During the garbage collection operation, a new container 212 is created. The new container 212 when written, will include compression regions (represented by a compression region 214). The compression region 214, like the other compression regions, will include segments 216 when written. During a copy forward procedure when writing to the container 212, the live compression regions of the container 202 may be written into the container 212. In this example, the compression region 204 is written into the container 212 as the compression region 214. Thus, the segments 216 are the same as the segments 206.

During garbage collection, the compression regions written into the new container 212 may come from multiple source containers. In addition, metadata is created and stored as necessary such that the new locations of the compression regions, their contents and the location of the segments 218 is maintained by the data protection system.

In one example, the compression region 204 is copied forward by copying forward based on the location of the compression region 204 within the container 202. The GC microservice that performs the copy forward may be provided with an identifier of the container 202, a start location of the compression region 204 within the container 202, and a size of the compression region 204. This allows the GC microservice to copy the compression region 204 into the container 212 without understanding the format of the compression region 204 and without having to perform computationally expensive procedures such as decompression and/or decryption.

Embodiments of the invention allow fine-grained copy-forward decisions without network transfer of data back to the source site (e.g., the network 102). Network transfer can be avoided by creating one or more GC microservice instances in the cloud. These GC microservice instances have an advantage in that they can read cloud containers without the transfer cost of reading back to the on-premise data protection system 110. The GC microservice instances may start RPC (remote procedure call) servers and receive calls from the data protection system 110 that include recipes specifying how to perform copy forward. When the garbage collection operation completes, the GC microservice instances exit, so computational costs remain low.

A recipe from the data protection system may include a series of instructions such as:

Copy from Container A, from Start1 of Length1 bytes to Container C.
Copy from Container A, from Start2 of Length2 bytes to Container C.
Copy from Container B, from Start3 of Length3 bytes to Container C.
Confirm Container C has Checksum value and write to object storage.
Delete Containers A and B.

While the above example recipe focuses on byte ranges being copied from an old container to a new container, these byte ranges can be selected to align with compression regions within a container.

As an integrity check, the checksum may be calculated over the fingerprints within the container when the data protection system does not have the segments themselves and only has their references. The fingerprints are stored in the metadata 116 associated with the containers in the cloud. As a result, metadata may also be stored in the cloud that relates to the segments stored in the cloud.

Figure 3:
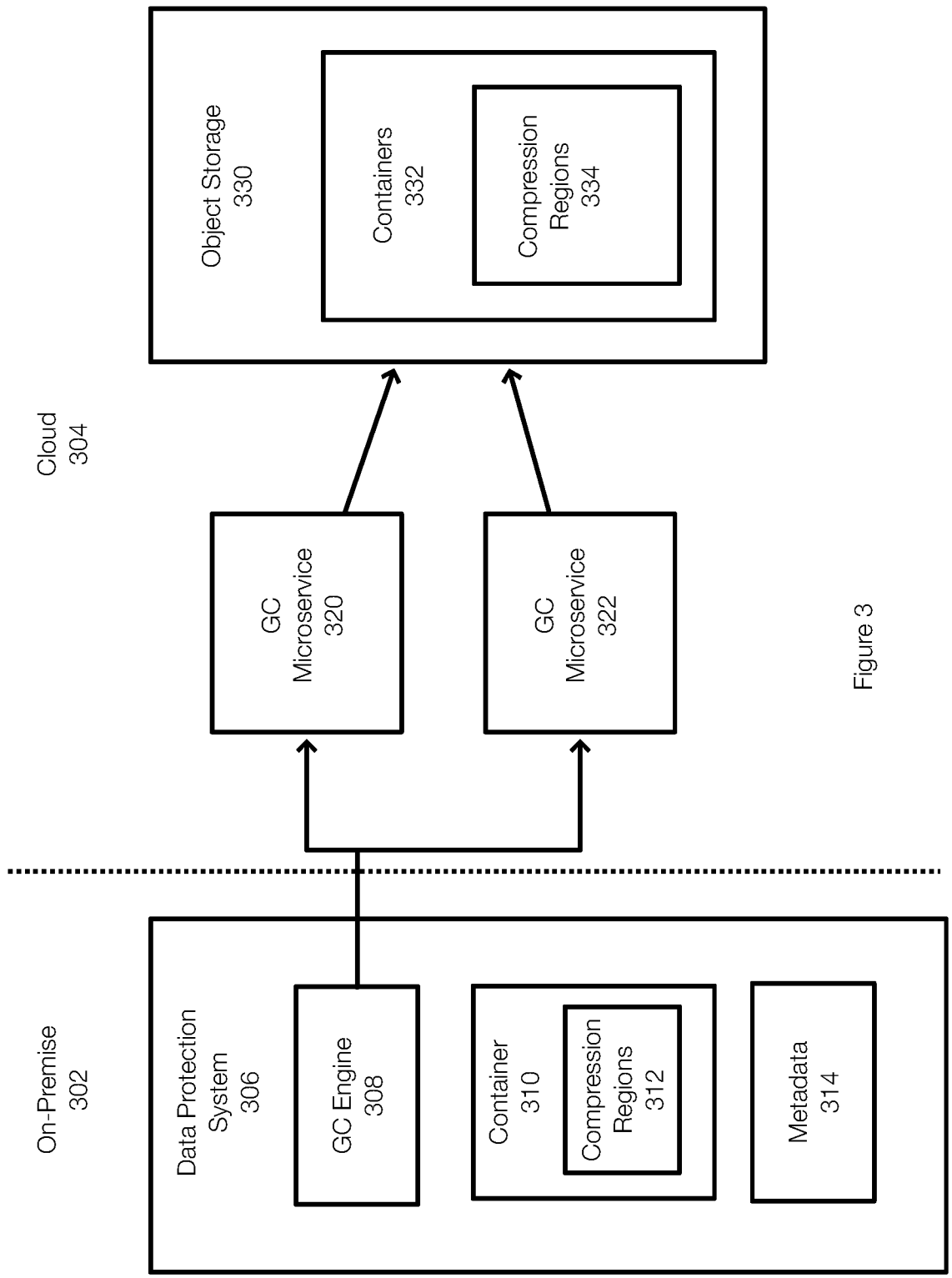
FIG. 3 illustrates an example of a cloud-based microservice configured to perform a data collection operation on a cloud-based object storage storing a cloud tier.

FIG. 3 illustrates systems and methods for performing a garbage collection operation in the context of a system 302 (e.g., an on-premise system) that is associated with an active tier and a cloud system 304 that is associated with a cloud tier. FIG. 3 illustrates a data protection system 306 (an example of the data protection system 110) that includes a GC engine 308 and that maintains containers (represented by a container 310 that includes compression regions 312 in the active tier. Some of the data has been migrated to the object storage 330 in the cloud 304 and stored in containers represented by the containers 332 that each include compression regions 334. The object storage 330 may also store other containers such as CMETA containers.

During a garbage collection operation, the GC engine 308 may start or initiate one or more instances of a GC microservice, represented by a GC microservice 320 and a GC microservice 322. The GC microservices 320 and 322 are configured to clean the containers 332. As illustrated, the data protection system 306 or the GC engine 308 instantiates one or more instances of the GC microservice 320 in the cloud. The GC microservices 320 and 322 can interact with the containers 332 in the cloud object storage 330 without incurring data transfer costs as previously described.

The garbage collection operation is scalable and may work on a batch of containers. For example, the containers can be processed in batches also referred to as a range of containers. When processing the first batch, the GC engine 308 may allocate a portion of the batch to each of the GC microservices 320 and 322, This allows the batch to be cleaned in parallel, Batches can be processed in succession.

Figure 4:
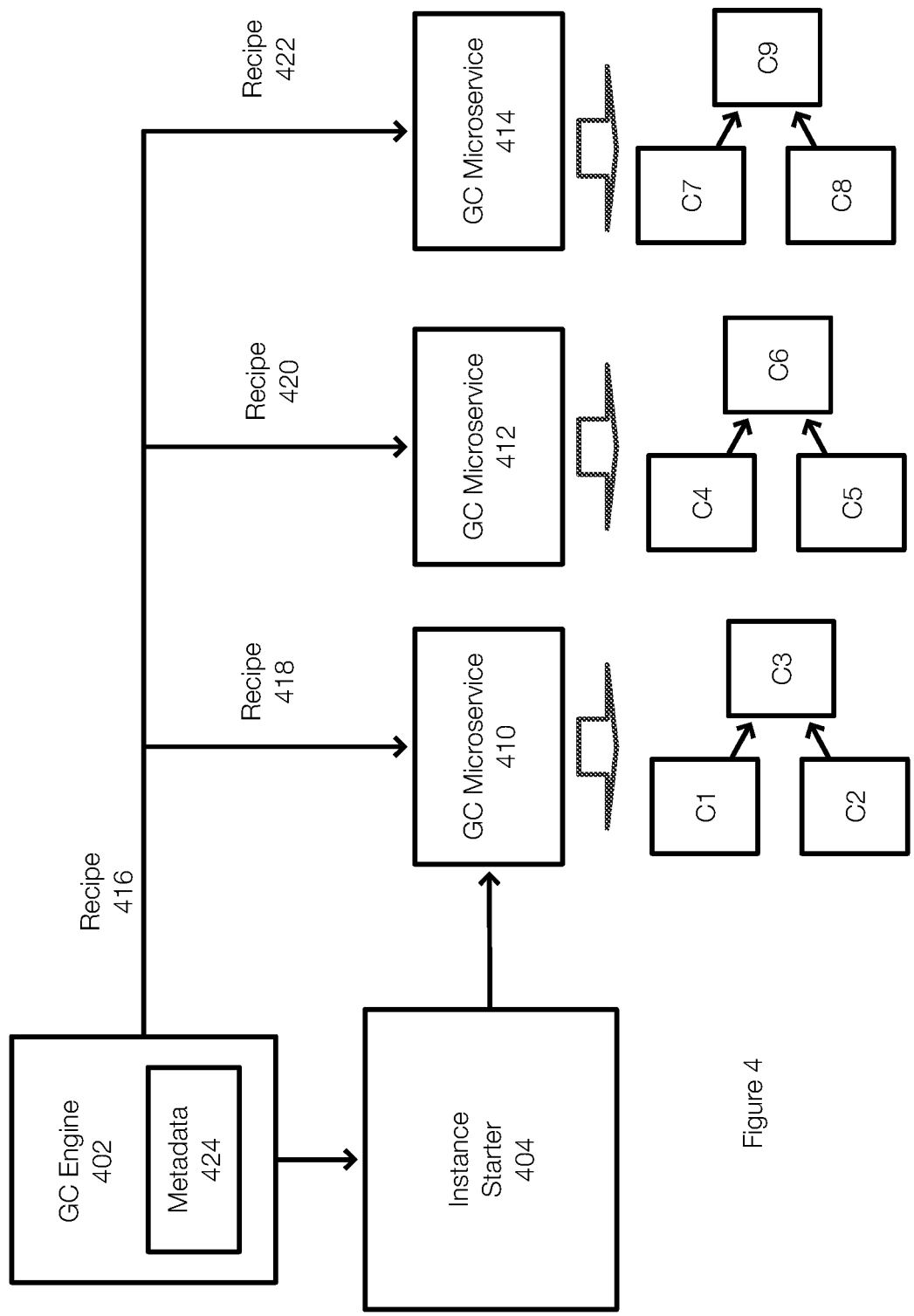
FIG. 4 illustrates an example of performing a microservice based garbage collection operation in a cloud tier.

FIG. 4 illustrates a microservice-based system for cleaning data stored in the cloud or in a cloud tier of a data protection system. FIG. 4 illustrates a garbage collection engine 402 that may be part of a data protection system such as the data protection system 110. The garbage collection engine 402 is scalable and may be configured to control and manage multiple instances or multiple GC microservices.

When a garbage collection operation is initiated, the garbage collection engine 402 may start an instance starter 404, which may be part of the GC engine 402. The instance starter 404 is responsible for spinning up instances of the GC microservice (GC microservices 410, 412 and 414 in this example). The instance starter 404 may also be responsible for spinning down the instances of the GC microservices when the garbage collection operation ends. The instance starter 404 may also ensure that the GC microservices 410, 412, and 414 are up and running.

In this example, the GC engine 402 may control and/or manage the GC microservices that are actually performing the cleaning or the copy forwarding. In this example, the GC engine 402 can communicate with the GC microservices 410, 412 and 414 and provide instructions for execution. GC microservices 410, 412, and 414.

The GC engine 402 is configured to evaluate the metadata 424 and identify the data to be removed from the cloud tier. The metadata can be evaluated or processed to determine or identify which data in the cloud is live and which data is dead. In one example, the metadata 424 can be used to identify live compression regions and dead compression regions.

This metadata 424 allows the GC engine 402 to generate a recipe or an instruction that can be sent directly to the GC microservices 410, 412 and 414. Thus, the GC engine 402 may send a recipe 416 to the GC microservices 410, 412 and 414. More specifically, the GC engine 402 may distribute specific recipes. In one example, the GC engine 402 may only send portions of the recipe 416 to each of the microservices 410, 412 and 414. This allows the GC engine 402 to perform load balancing and allows the containers to be cleaned in batches and in parallel. The GC microservice 410, upon receiving the recipe 418 for example, performs the instructions included in the recipe 418. In this example, this includes copying live ranges specified in the recipes from old or existing cloud containers C1 and C2 into a new cloud container C3 and then deleting the cloud containers C1 and C2. As previously stated, a compression region is an example of a range and the sizes of the ranges in the recipes for different containers can be different. The GC engine 402 may ensure that the GC microservice 410 has copied all live ranges identified in the recipes into the new containers and may ensure that there is no corruption or errors. Similarly, the GC microservice 412 performs the recipe 420 and copies live ranges from the containers C4 and C5 into a new container C6 and then deletes containers C4 and C5. Similarly, the GC microservice 414 executes the recipe 422 and copies live ranges the containers C7 and C8 into the new container C9 and then deletes the containers C7 and C8.

More specifically in one example, the GC microservice 410 may receive the recipe 418 from the GC engine 402. As previously stated, the recipe 418 may be a part of the recipe 416 or may correspond to the portion of the recipe 416 to be performed by the GC microservice 410. Thus, the GC microservice 410 receives and reads the recipe 418. The recipe is then performed by the GC microservice 410. Similarly, the GC microservices 412 and 414 perform, respectively, the recipes 420 and 422. In one example, the identifiers (IDs) of the new containers may also be specified in the recipe 418 and in the other recipes. This is an example of metadata that allows the data protection system to know the location of the segments after the copy forward process or after the garbage collection operation.

A container may have, by way of example only, two parts: a metadata section and data sections or compression regions. In the data section, each compression region includes a bunch of compressed segments. For each segment, a fingerprint may be calculated for deduplication purposes. The metadata section represents or stores the meta information of the container and may include various fields such as, but not limited to: how many compression regions are in the container, compressed and uncompressed sized of the compression regions, number of segments in each compression regions, total number of segments in the container, and a table of the fingerprints of all of the segments stored in the container.

Figure 5:
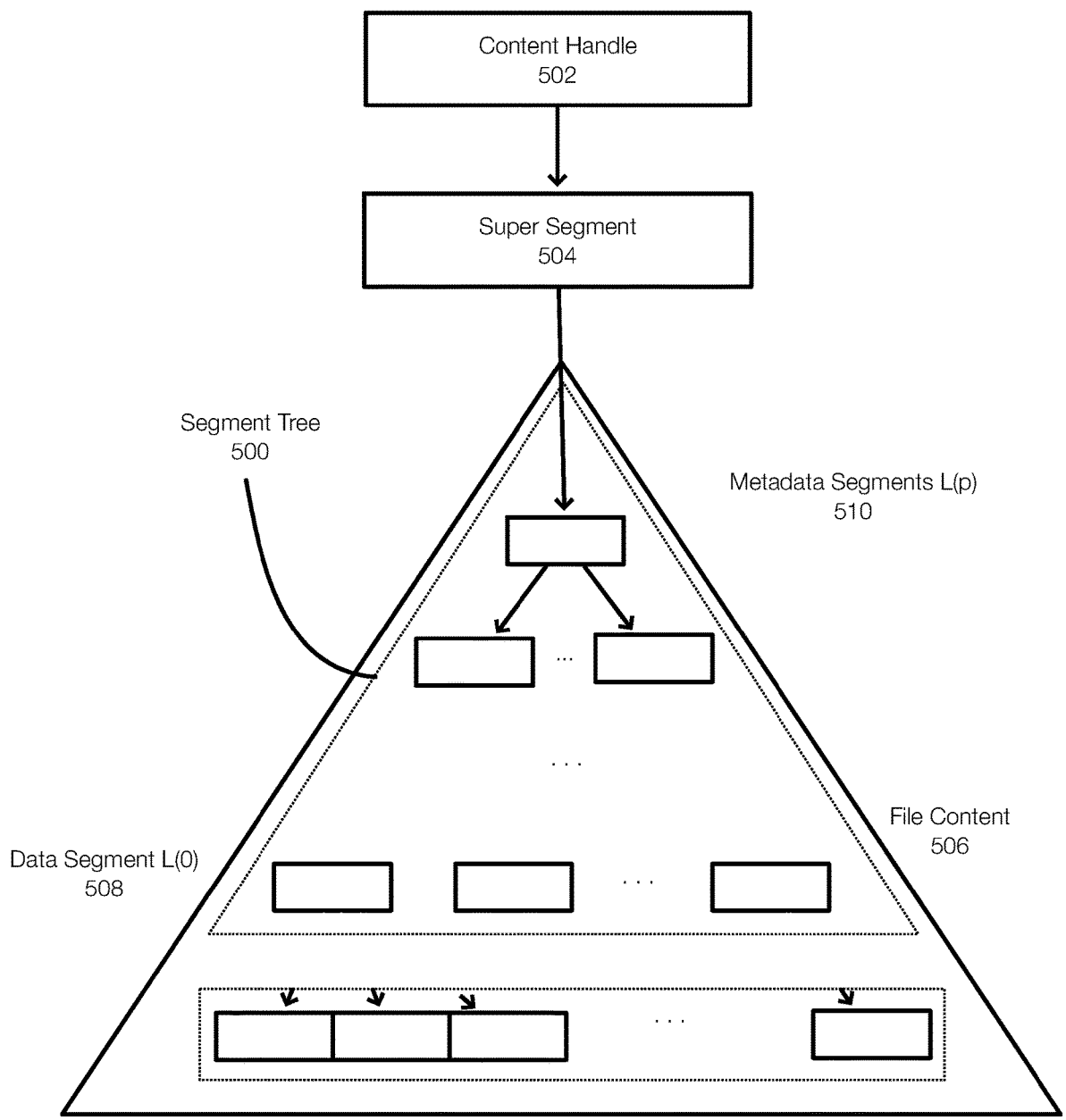
FIG. 5 illustrates an example of an object or file and how the object may be stored in a container.

FIG. 5 illustrates an example of how a file, or an object may be represented in the active tier or in the cloud tier. A storage system may represent objects or files as a segment tree as illustrated in FIG. 5. A content handle 502 may point to a super segment 504 (which may be an example of an L6 segment). The metadata segments 510 may include Lp segments (e.g., L1 to L6 segments). Data segments L0 508 are the actual data of the file or object and may be stored in the leaf nodes of the segment tree 500. The metadata segments 510 and the data segments 508 are usually stored in separate containers. Thus, containers that store Lp segments may be referred to as Lp containers and containers that store L0 segments may be referred to as L0 containers.

A CMETA container is a container that stores metadata. More specifically, a CMETA container may store a collection of metadata sections of L0 and Lp containers. During garbage collection, the metadata (CMETA and Lp) is used to identify the live segments and the dead segments or to identify live compression regions and dead compression regions. In order to avoid reading the metadata from the cloud, the metadata (e.g., CMETA containers and Lp containers) is stored locally and is replicated to the cloud. L0 containers are only written to the cloud in one embodiment. In one embodiment, the data is thus deduplicated with respect to both the active tier and the cloud tier. In one example, CMETA containers and Lp containers are maintained locally and in the cloud.

During garbage collection, the GC engine 308 may read the local CMETA containers. By reading the local CMETA containers, metadata of actual L0 containers and Lp containers can be obtained. This metadata may include fingerprints of all segments of the actual L0 and Lp containers.

Using this metadata, the GC engine 308 may look up fingerprints to determine the live and dead compression regions or ranges of the Lp containers. The live compression regions or ranges of the existing Lp containers are then copied into new Lp containers. The new Lp containers are written locally and written to the cloud. Next, the metadata section of the new Lp containers are copied into a new CMETA container and the new CMETA container is written locally and as an object to the cloud.

Next, the metadata sections of the local CMETA containers are read to identify the live compression regions or ranges of source or existing L0 containers. This may be an iterative process. This allows a recipe (source_object_ID, offset, size) for live compression regions in the existing containers to be identified. These recipes are passed to the GC microservice (e.g., the GC microservice 320 in FIG. 3) so that the live compression regions can be copied forward into new containers or objects in the cloud.

Next, the metadata corresponding to the compression regions in the new containers is copied forward into a new CMETA container locally and replicated to the cloud. Finally, the source (containers from which regions or ranges were copied forward) Lp, L0 and CMETA containers can be deleted to reclaim cloud space.

In deduplicated storage systems, as previously discussed, the containers may store different types of data. Some containers may store data segments (e.g., L0 containers) while other containers may store data used in storing and reconstructing objects (e.g., Lp containers). These containers can be similarly processed during garbage collection.

In one example, the GC engine 402 is aware of the containers that store the data in the cloud tier. Thus, the GC engine 402 stores or has access to metadata 424 describing the containers C1, C2, C4, C5, C7 and C8.

The recipe, in one example, may include a list of source containers to copy live ranges from, start locations and sizes of the ranges, destination container list, destination CMETA list. Thus, the recipe identifies the containers that are to be cleaned, ranges that identify live data regions such as live compression regions, the destination container list and the destination CMETA. This recipe is sent to the GC microservices. Once this copy forward process is complete in the cloud tier, the new CMETA containers are written locally and replicated to the cloud in one example. The CMETA containers correspond to the cloud tier containers and may contain metadata related to what is stored in the cloud tier. The CMETA containers thus enable deduplication. The Lp containers are also written locally.

When this process is completed and verified, the GC microservices may report back to the GC engine 402 that the garbage collection has been performed successfully or report any error that may have occurred.

Figure 8:
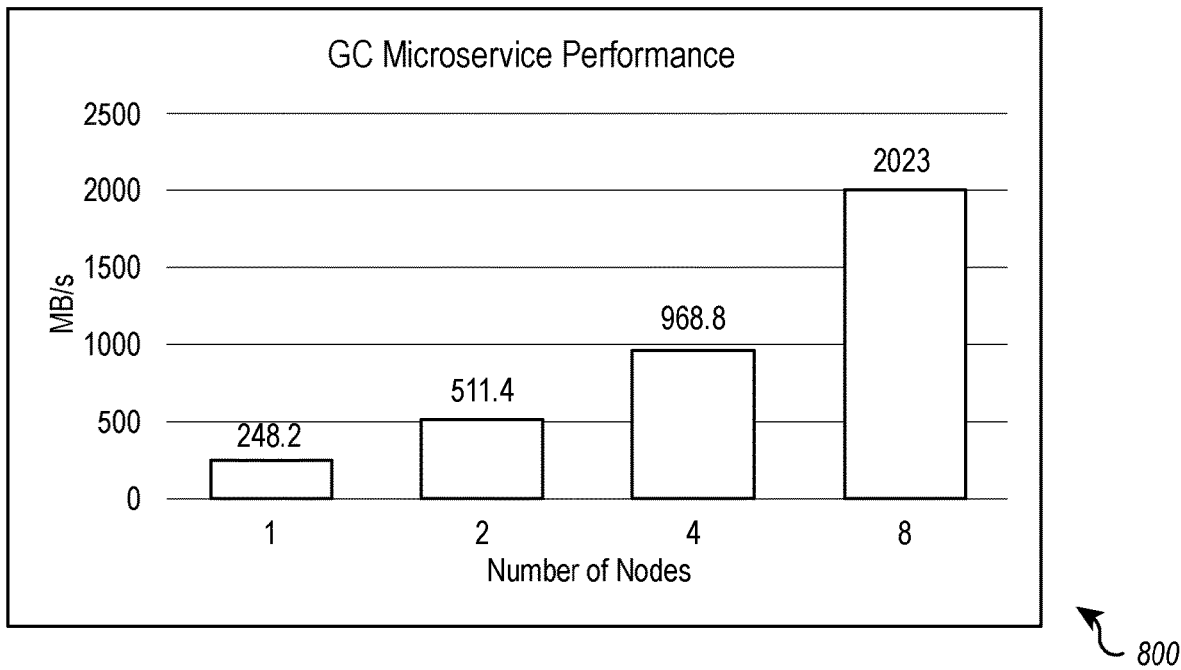

The following discussion illustrates examples of experiments in the cloud and presents a cost analysis. FIG. 8 shows GC performance 800 as the number of instances increases from 1 to 8. The vertical axis is the throughput (MB/s) of copying forward segments into new compression regions and writing out containers. Performance is close to linear scaling.

In a cost analysis, it is assumed by way of example only, that the data protection system may write 4 MB sized objects. Conventionally, these objects do not die quickly (meaning that live segments may be present for a long time, they are not expected to quickly die due to fragmentation caused by deduplication). Thus, even if one segment in the 4 MB object is referenced by any file, the object cannot be deleted. The conventional solution is to perform ingress/egress cost in a situation where the object is transferred to the source site, cleaned, and then written back to the cloud.

By running GC microservices in the cloud, the ingress/egress cost is avoided. There is, however, a compute cost of running these GC microservices. As a result, the cost of GC microservices can be compared with the cost of transferring these objects over the network (ingress/egress cost).

Figure 6:
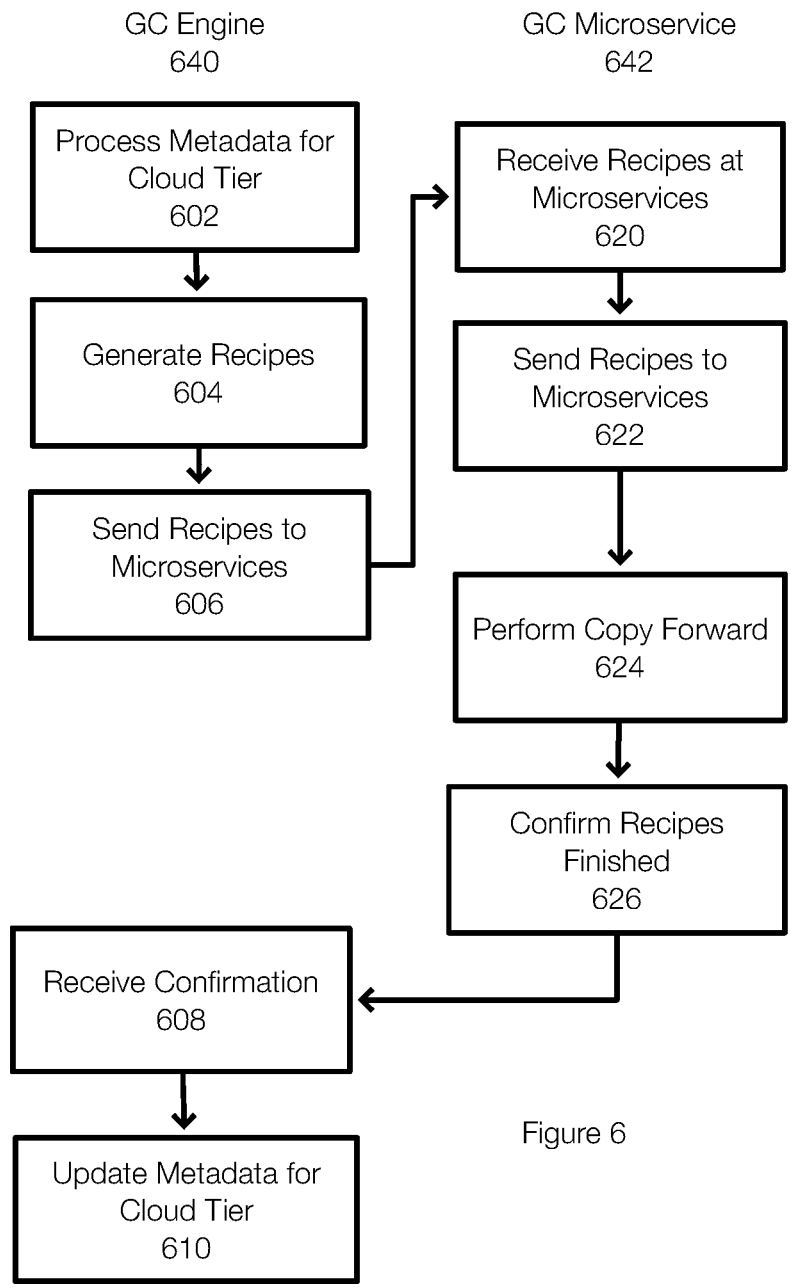
FIG. 6 illustrates an example of a method for performing garbage collection in a cloud tier.

FIG. 6 illustrates an example of a method for performing a data protection operation such as garbage collection on a cloud tier. FIG. 6 illustrates a method performed by the data protection system as a whole and illustrates aspects of a garbage collection operation that may be performed by various components. For example, the GC engine 640 may be located on-premise and may be configured to control data protection operations including garbage collection operations for the active tier and the cloud tier. Embodiments of the invention may also apply to a situation where the source is a cloud-based system.

The GC engine 640 may communicate with a GC microservice 642 that is instantiated in the cloud. The GC microservice 642 may be configured to manage the garbage collection operation in the cloud by performing or controlling the performance of recipes received from the GC engine 640 and ensuring that the recipes are performed. The GC microservice 642, which may be implemented as a server, may perform part of the garbage collection operation including copy forward.

The method shown in FIG. 6 may begin by processing 602 metadata for the cloud tier. The on-premise system typically stores metadata describing the containers stored in the cloud and processing the metadata may include evaluating the metadata for containers stored in the cloud tier to identify the liveness and deadness of the data stored in the containers. In one example, the metadata may allow the GC engine 640 to identify which segments are dead segments and which segments, in each container (and in each compression region) are live segments. This allows the GC engine 640 to identify live ranges or compression regions and dead ranges or compression regions.

Because the GC engine is aware of the locations of the ranges or compression regions and is aware of their status (live/dead), recipes can be generated 604 such that the live ranges or compression regions can be copied forward. These recipes, as previously stated, allows these ranges or compression regions to be copied forward without regard to format, compression, or encryption.

More specifically in one example, the GC engine 640 is also aware of how the data is compressed and/or encrypted. Thus, the size of the ranges in their compressed/encrypted form can be determined. In one example, this information is present in the CMETA, which describes the information stored in the containers.

The recipe generated by the GC engine 640 typically identifies a source container, data locations (e.g., offset or starting address in a container), length or size, and a destination container. This information allows the GC microservice 642 to copy data at the locations, which correspond to the live ranges or compression regions, to the new destination container. The recipe may include a container list, range live/dead indicators, destination container list, CMETA list.

Once generated, the recipes are sent 606 to the GC microservices 642 that have been instantiated in the cloud. The GC microservices thus receive the recipes 620 and perform the copy forward based on the received recipes. As previously stated, the recipes can be divided up amongst multiple GC microservice instances. Thus, in one example, the recipes may be distributed 622 to GC microservices and the recipes are performed 624 by performing copy forward using the recipes.

The copy forward can be performed, for example, copying the data identified in the recipes into the new containers. This may be performed for both Lp containers and L0 containers. The CMETA for the new containers may be stored in a new CMETA container. The GC microservice 642 may confirm 626 that the recipes have been executed or fully performed.

The GC engine 640 then receives 608 confirmation that the recipe has been executed. This may include receiving metadata associated with the new containers. The metadata for the cloud tier is updated 610 by the GC engine 640. This may include generating new metadata containers locally and replicating the new metadata containers to the cloud.

FIG. 7 illustrates the cost of running GC once a month on a cloud provider. This cloud provider has two storage configurations—Standard and Standard Infrequent Access. The cost for other cloud providers is similar.

A 1 PB cloud tier is assumed in this example. From experience, it is determined that there can be a 10% churn per GC cycle. Thus, out of 1 PB, 100 TB of data is expected to be dead. Due the fragmentation, the live and dead data will be distributed in a container (i.e. a container will have both live and dead data). The average liveness of a container that is cleaned is 50% (i.e. 50% of segments are dead and 50% are live). Based on these assumptions, to clean 100 TB of dead data with 50% average liveness, GC needs to read 200 TB of data from the cloud and write 100 TB of new data to the cloud. If each object size is 4 MB, GC needs to read 200 TB/4 MB=52428800 objects and write 52428800/2=26214400 objects to the cloud. The transaction cost of PUT operations is $0.005 per 1,000 requests and the cost of get is per 1000 requests. Thus, the transaction cost to read 52428800 objects is $262 and $10 for writing. But the major cost is the data transfer cost—ingress/egress cost. The data transfer cost for 200 TB of read and 100 TB of write is $14,994 Standard storage and $7826 for infrequent access.

As illustrated in FIG. 7, the cost saved due to data cleaned is $2126.25 as the monthly data storage cost on the cloud is reduced.

If egress/ingress cost is avoided by running a GC microservice which performs the copy operation inside the cloud, $14994 per month can be saved.

Next, the compute cost associated with a GC microservice configuration is examined. The compute cost for running a serverless instance is considered. In one example, this configuration may have 16 cores, 64 GB of memory and costs $0.8 per hour. In addition, the speed of such an instance can also be varied. In one example, at least 200 MB/s copy speed can be achieved. If 8 instances are spun up, a speed of 1.6 GB/s can be achieved. In this example and at this speed, it will require about 12800 seconds or about 35 hours to copy forward 200 TB of data. This results in a cost of $227.

Embodiments of the invention thus achieve a reduction in cost per GC cycle on the order of 66x. Further, it is much faster as many instances as desired can be started or the number can be controlled based on the data to be copied. In comparison, to copy forward over a network is significantly more costly and slower. Assuming that the network has 100 MB bandwidth, 100 MB/s read cannot be achieved in the best-case scenario. Thus, embodiments of the invention conserves network bandwidth for data movement to the cloud rather than wasting network bandwidth on conventional garbage collection methods.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data management operations. Such data management operations may include, but are not limited to, data read/write/delete operations, data backup operations, data restore operations, data cloning operations, data archiving operations, and disaster recovery operations. Thus, while the discussion herein may, in some respects, be directed to a discussion of data protection environments and operations, the scope of the invention is not so limited. More generally then, the scope of the invention embraces any operating environment in which the disclosed concepts may be useful. By way of illustration, but not limitation, embodiments of the invention may be employed in connection with data backup and restore platforms such as the Dell-EMC NetWorker and Avamar and Data Domain platforms.

A data protection environment may take the form of a public or private cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices or entities disclosed herein may be protected by one or more data protection policies according to various embodiments of the invention. Yet other examples of devices that may be protected by way of a data protection policy according to embodiments of the invention include, but are not limited to, containers, and VMs.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, containers, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing system that provides an active tier of data and a cloud tier of data in a cloud, a method for performing a garbage collection operation in the cloud tier, the method comprising:
processing metadata, stored in the active tier, for the cloud tier by a garbage collection engine to identify containers in the cloud tier to be cleaned, wherein the identified containers contain compression regions;
determining from the metadata which of the compression regions in the cloud tier are dead compression regions and which of the compression regions in the cloud tier are live compression regions;
instantiating an instance starter by the garbage collection engine to spin up a microservice in the cloud and spinning up the microservice;
generating recipes that identify locations of the live compression regions in the identified containers, wherein the recipes specify byte ranges of the live compression regions in the identified containers;
sending the recipes to the microservice, wherein the microservice copies data in the byte ranges of the live compression regions to copy to new containers, without performing decryption operations, from the identified containers and then deletes the identified containers; and
spinning down the microservice when the garbage collection operation ends.

2. The method of claim 1, wherein each recipe identifies at least a container, a location of a live compression region in the container, a size of the live compression region, and a destination container for storing the live compression region.

3. The method of claim 1, wherein the recipes are distributed to a plurality of microservice instances such that cloud tier of data is cleaned in parallel.

4. The method of claim 1, further comprising updating the metadata stored in the active tier to reflect the locations of the live compression regions in the new containers stored in the cloud tier after performing the recipes.

5. The method of claim 1, wherein the metadata includes metadata of L0 and Lp containers stored in the cloud, the metadata of the L0 and Lp containers stored in the cloud including fingerprints of segments in the L0 and Lp containers.

6. The method of claim 5, further comprising performing a lookup to identify live compression regions and dead compression regions of the Lp containers.

7. The method of claim 6, further comprising generating the recipes that allow the live compression regions from the Lp containers to be copied into new LP containers.

8. The method of claim 7, further comprising writing the new Lp containers locally and to the cloud.

9. The method of claim 8, further comprising copying metadata of the new Lp containers to a new CMETA container, wherein the new CMETA container is written locally and to the cloud.

10. The method of claim 1, further comprising iterating metadata sections of local CMETA containers to identify the live compression regions of L0 containers.

11. The method of claim 10, further comprising forming the recipes based on the local CMETA containers.

12. The method of claim 11, further comprising copying metadata corresponding to the recipes into a new CMETA container locally and replicating the new CMETA container to the cloud.

13. The method of claim 12, further comprising deleting the Lp, L0 and CMETA containers from which live compression regions were copied forward to reclaim space in the cloud.

14. The method of claim 1, wherein the live compression regions are copied forward without regard to format, compression status, and encryption status, wherein at least some of the live compression regions include dead segments and wherein only live segments from these live compression regions are copied to the new containers.

15. A non-transitory computer readable medium comprising computer executable instructions that, when executed, perform a garbage collection operation in a cloud tier of data in a cloud associated with a computing system that also has a local tier of data, the method comprising:

processing metadata, stored in the active tier, for the cloud tier by a garbage collection engine to identify containers in the cloud tier to be cleaned, wherein the identified containers contain compression regions;

determining from the metadata which of the compression regions in the cloud tier are dead compression regions and which of the compression regions in the cloud tier are live compression regions;

instantiating an instance starter by the garbage collection engine to spin up a microservice in the cloud and spinning up the microservice;

generating recipes that identify locations of the live compression regions in the identified containers, wherein the recipes specify byte ranges of the live compression regions in the identified containers;

sending the recipes to the microservice, wherein the microservice copies data in the byte ranges of the live compression regions to copy to new containers, without performing decryption operations, from the identified containers and then deletes the identified containers; and spinning down the microservice when the garbage collection operation ends.

16. The non-transitory computer readable medium of claim 15, wherein each of the recipes identifies at least an existing container, a location of a live compression region, a size of the live compression region, and a destination container for storing the live compression region.

17. The non-transitory computer readable medium of claim 15, wherein only live segments in the live compression regions are copied forward to the new containers.

18. The non-transitory computer readable medium of claim 15, further comprising updating the metadata in the active tier to reflect the cloud tier of data after performing the recipes.

19. The non-transitory computer readable medium of claim 15, further comprising:

identifying, from the metadata, metadata of L0 and Lp containers stored in the cloud, the metadata of the L0 and Lp containers stored in the cloud including fingerprints of segments in the L0 and Lp containers;

performing a lookup to identify live regions and dead regions of the Lp containers;

generating the recipes that allow the live regions from the Lp containers to be copied into new LP containers;

writing the new Lp containers locally and to the cloud; and copying metadata of the new Lp containers to a new CMETA container, wherein the new CMETA container is written locally and to the cloud.

20. The method of claim 19, further comprising:

iterating metadata sections of local CMETA containers to identify live compression regions of L0 containers;

forming the recipes based on the local CMETA containers; and copying metadata corresponding to the recipes into a new CMETA container locally and replicating the new CMETA container to the cloud.

* * * * *